(12) United States Patent
Kawashima

(10) Patent No.: US 12,208,701 B2
(45) Date of Patent: Jan. 28, 2025

(54) SYSTEM AND METHOD FOR IDENTIFYING AN ELECTRIC VEHICLE THROUGH ALTERNATING CURRENT ELECTRIC CHARGING

(71) Applicant: Honda Motor Co., Ltd., Tokyo (JP)

(72) Inventor: Kiyotaka Kawashima, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 517 days.

(21) Appl. No.: 17/520,996

(22) Filed: Nov. 8, 2021

(65) Prior Publication Data

US 2023/0141162 A1 May 11, 2023

(51) Int. Cl.
| | |
|---|---|
| *B60L 53/65* | (2019.01) |
| *B60L 53/60* | (2019.01) |
| *B60L 53/62* | (2019.01) |
| *B60L 53/66* | (2019.01) |
| *B60L 53/68* | (2019.01) |
| *H02J 7/00* | (2006.01) |
| *H04L 9/32* | (2006.01) |

(52) U.S. Cl.
CPC ............... *B60L 53/65* (2019.02); *B60L 53/60* (2019.02); *B60L 53/62* (2019.02); *B60L 53/66* (2019.02); *B60L 53/68* (2019.02); *H02J 7/00032* (2020.01); *H02J 7/00034* (2020.01); *H02J 7/00045* (2020.01); *H04L 9/3226* (2013.01); *H04L 2209/84* (2013.01)

(58) Field of Classification Search
CPC .......... B60L 53/65; B60L 53/60; B60L 53/62; B60L 53/66; B60L 53/68; H02J 7/00032; H02J 7/00034; H02J 7/00045; H04L 9/3226; H04L 2209/84

USPC ......................................................... 320/109
See application file for complete search history.

(56) References Cited

U.S. PATENT DOCUMENTS

| | | | |
|---|---|---|---|
| 8,686,686 B2 | 4/2014 | Boot | |
| 8,692,513 B2 | 4/2014 | Gaul et al. | |
| 9,050,901 B2 * | 6/2015 | Kim | ........................ B60L 55/00 |
| 9,118,183 B2 | 8/2015 | Erger | |
| 9,296,307 B2 | 3/2016 | Nosaka | |

(Continued)

FOREIGN PATENT DOCUMENTS

| | | | | |
|---|---|---|---|---|
| DE | 102009054483 A1 * | 6/2010 | .......... | B60L 11/1816 |
| DE | 102017200857 | 7/2018 | | |

(Continued)

*Primary Examiner* — Richard Isla
*Assistant Examiner* — Manuel Hernandez
(74) *Attorney, Agent, or Firm* — Rankin Hill & Clark LLP

(57) ABSTRACT

A system and method for identifying an electric vehicle through an alternating current electric charging that include receiving a charging command to initiate the alternating current electric charging of the electric vehicle (EV) through electric vehicle supply equipment (EVSE). The system and method also include generating a duty cycle pattern that pertains to the electric charging of the EV that includes at least one encrypted data packet and communicating the duty cycle pattern to at least one of: the EV and the EVSE. The system and method further include comparing an identification of at least one of: the EV and the EVSE included within the at least one encrypted data packet of the duty cycle pattern with a pre-stored identification of: the EV and the EVSE to identify at least one of: the EV and the EVSE.

20 Claims, 7 Drawing Sheets

(56) References Cited

U.S. PATENT DOCUMENTS

| | | | |
|---|---|---|---|
| 9,716,927 B2* | 7/2017 | Droste | G07C 5/008 |
| 10,220,719 B2* | 3/2019 | Haas | B60L 53/62 |
| 10,399,451 B2* | 9/2019 | Zaki | B60L 53/16 |
| 10,425,621 B2* | 9/2019 | Haas | B60L 53/65 |
| 10,500,968 B2* | 12/2019 | Shumaker | B60L 53/30 |
| 10,749,680 B1* | 8/2020 | Troia | B60R 25/24 |
| 10,882,415 B2* | 1/2021 | Hooker | B60L 53/14 |
| 10,972,143 B2* | 4/2021 | Hoshino | H04B 1/3822 |
| 11,007,892 B2 | 5/2021 | Metzger | |
| 11,807,128 B2* | 11/2023 | Spina | H02J 7/00032 |
| 2010/0145568 A1* | 6/2010 | Watanabe | G07C 5/085 |
| | | | 701/29.6 |
| 2010/0161518 A1* | 6/2010 | Littrell | G06Q 50/06 |
| | | | 705/412 |
| 2010/0274570 A1* | 10/2010 | Proefke | B60L 53/67 |
| | | | 701/22 |
| 2011/0202217 A1* | 8/2011 | Kempton | H02J 3/008 |
| | | | 320/109 |
| 2012/0095642 A1* | 4/2012 | Nishida | H04L 9/3234 |
| | | | 701/1 |
| 2012/0139489 A1* | 6/2012 | Gaul | H02J 7/00041 |
| | | | 320/109 |
| 2013/0009597 A1* | 1/2013 | Boot | B60L 53/65 |
| | | | 320/109 |
| 2013/0015815 A1* | 1/2013 | Bianco | B60L 3/12 |
| | | | 320/109 |
| 2013/0328525 A1* | 12/2013 | Erger | H02J 7/00 |
| | | | 320/109 |
| 2014/0036989 A1* | 2/2014 | Heinrich | H02J 7/00 |
| | | | 320/109 |
| 2014/0159659 A1* | 6/2014 | Nosaka | B60L 53/16 |
| | | | 320/109 |
| 2014/0312853 A1* | 10/2014 | Dreina | B60L 53/65 |
| | | | 320/145 |
| 2014/0337253 A1* | 11/2014 | Berezin | G06Q 50/06 |
| | | | 705/412 |
| 2015/0137753 A1* | 5/2015 | Cha | B60L 58/13 |
| | | | 320/109 |
| 2015/0210172 A1* | 7/2015 | Kanayama | H02J 13/00007 |
| | | | 320/109 |
| 2017/0024552 A1* | 1/2017 | Rodine | B60L 53/62 |
| 2017/0136894 A1* | 5/2017 | Ricci | B60L 53/65 |
| 2019/0225107 A1* | 7/2019 | Morizono | B60L 53/68 |
| 2019/0259225 A1* | 8/2019 | Amendolagine | G07C 5/085 |
| 2019/0263286 A1* | 8/2019 | Metzger | B60L 53/65 |
| 2019/0291589 A1* | 9/2019 | Erb | B60L 53/665 |
| 2019/0306149 A1* | 10/2019 | Vazquez Vidal | H04L 9/3268 |
| 2019/0381908 A1* | 12/2019 | Joo | G06F 3/14 |
| 2020/0139840 A1* | 5/2020 | Roeder | H04W 12/08 |
| 2020/0189416 A1* | 6/2020 | Jung | H02J 7/0045 |
| 2020/0343923 A1* | 10/2020 | Hoshino | H04B 1/3822 |
| 2021/0129689 A1* | 5/2021 | Nakamura | B60L 53/34 |
| 2021/0291676 A1* | 9/2021 | Dietz | G06Q 20/38215 |
| 2022/0305927 A1* | 9/2022 | Haas | H02J 13/00032 |
| 2023/0122692 A1* | 4/2023 | Spina | B60L 53/66 |
| | | | 320/109 |
| 2023/0141162 A1* | 5/2023 | Kawashima | H04L 9/3226 |
| | | | 701/22 |
| 2024/0116390 A1* | 4/2024 | Haas | B60L 53/65 |
| 2024/0174112 A1* | 5/2024 | Layouni | B60L 53/65 |

FOREIGN PATENT DOCUMENTS

| | | | |
|---|---|---|---|
| DE | 102022122636 A1 * | 4/2023 | B60L 53/14 |
| EP | 4119388 A1 * | 1/2023 | B60L 53/305 |
| WO | WO-2010150594 A1 * | 12/2010 | B60L 11/1816 |
| WO | WO-2012081253 A1 * | 6/2012 | B60L 11/1816 |
| WO | WO-2013008429 A1 * | 1/2013 | B60L 11/1846 |
| WO | WO-2023249669 A1 * | 12/2023 | B60L 53/305 |

* cited by examiner

SYSTEM AND METHOD FOR IDENTIFYING AN ELECTRIC VEHICLE THROUGH ALTERNATING CURRENT ELECTRIC CHARGING

BACKGROUND

Electric vehicles contain electric storage mechanisms (e.g., electric engines powered by rechargeable batteries) to store electricity and power the electric vehicle. The electric storage mechanisms may be replenished periodically by using, for example, Electric Vehicle Supply Equipment (EVSE) installed at a residential home or EVSE installed at public or private charging stations. As the number of electric vehicles increase in the market, intelligent charging will play a critical role for grid stability, load control, cost savings, etc. However, various models of electric vehicles may be manufactured by various manufacturers and may be configured to require various amounts of charging power and/or in various charging configurations. Without an identification of the type of electric vehicle that is being charged by the EVSE, the supply of power to each vehicle may not be provided to sufficiently and efficiently charge the respective electric vehicle. In some cases, this may lead to difficulties with respect to setting a charging schedule for a particular electric vehicle.

BRIEF DESCRIPTION

According to one aspect, a computer-implemented method for identifying an electric vehicle through an alternating current electric charging that includes receiving a charging command to initiate the alternating current electric charging of the electric vehicle (EV) through electric vehicle supply equipment (EVSE). The computer-implemented method also includes generating a duty cycle pattern that pertains to the electric charging of the EV that includes at least one encrypted data packet associated with an identification of: the EV and the EVSE. The computer-implemented method additionally includes communicating the duty cycle pattern to at least one of: the EV and the EVSE and accessing data associated with a pre-stored identification of: the EV and the EVSE. The computer-implemented method further includes comparing the identification of at least one of: the EV and the EVSE included within the at least one encrypted data packet of the duty cycle pattern with the pre-stored identification of: the EV and the EVSE to identify at least one of: the EV and the EVSE.

According to another aspect, a system for identifying an electric vehicle through an alternating current electric charging that includes a memory storing instructions when executed by a processor cause the processor to receive a charging command to initiate the alternating current electric charging of the electric vehicle (EV) through electric vehicle supply equipment (EVSE). The instructions also cause the processor to generate a duty cycle pattern that pertains to the electric charging of the EV that includes at least one encrypted data packet associated with an identification of: the EV and the EVSE. The instructions additionally cause the processor to communicate the duty cycle pattern to at least one of: the EV and the EVSE and access data associated with a pre-stored identification of: the EV and the EVSE. The instructions further cause the processor to compare the identification of at least one of: the EV and the EVSE included within the at least one encrypted data packet of the duty cycle pattern with the pre-stored identification of: the EV and the EVSE to identify at least one of: the EV and the EVSE.

According to yet another aspect, a non-transitory computer readable storage medium storing instruction that when executed by a computer, which includes a processor perform a method that includes receiving a charging command to initiate the alternating current electric charging of the electric vehicle (EV) through electric vehicle supply equipment (EVSE). The method also includes generating a duty cycle pattern that pertains to the electric charging of the EV that includes at least one encrypted data packet associated with an identification of: the EV and the EVSE. The method additionally includes communicating the duty cycle pattern to at least one of: the EV and the EVSE and accessing data associated with a pre-stored identification of: the EV and the EVSE. The method further includes comparing the identification of at least one of: the EV and the EVSE included within the at least one encrypted data packet of the duty cycle pattern with the pre-stored identification of: the EV and the EVSE to identify at least one of: the EV and the EVSE.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
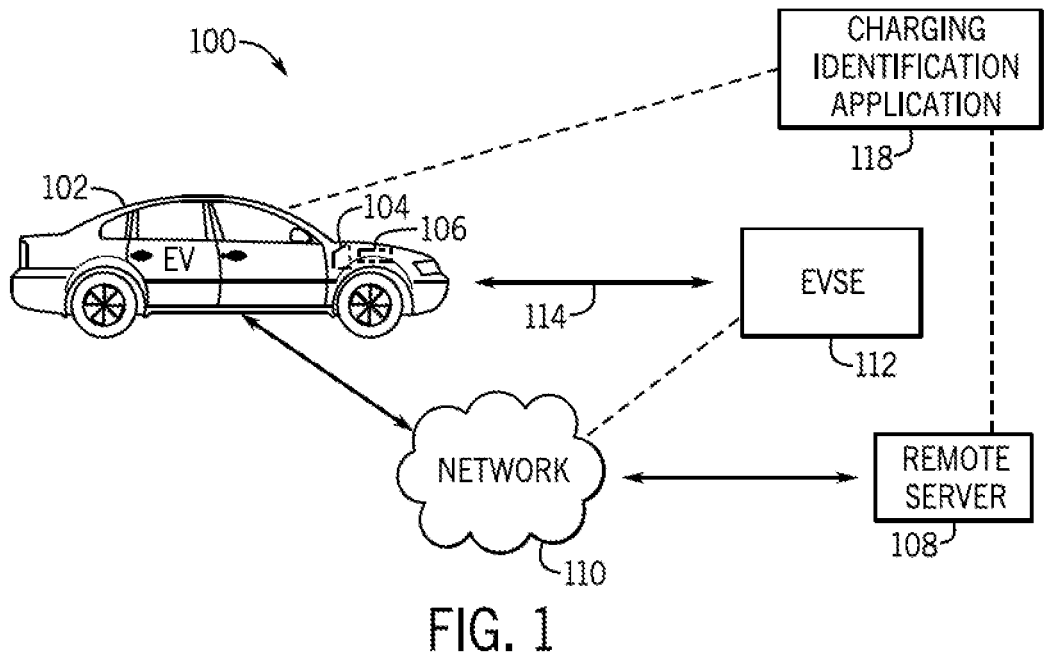
FIG. 1 is a schematic view of an exemplary system for identifying an electric vehicle (EV) through an alternating current (AC) electric charging according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for identifying an electric vehicle (EV) 102 through an alternating current (AC) electric charging according to an exemplary embodiment of the present disclosure. The components of the system 100, as well as the components of other systems, hardware architectures, and software architectures discussed herein, may be combined, omitted, or organized into different architectures for various embodiments.

In the exemplary embodiment of FIG. 1, the system 100 includes the EV 102 powered by an electric motor 104 and an electric storage mechanism, for example, a battery 106.

In one embodiment, the EV 102 is purely electric in that it only has the electric motor 104. In other embodiments, the EV 102 may have the electric motor 104 and an internal combustion engine (not shown). In some embodiments, the EV 102 may have any number of electric motors, batteries, and/or internal combustion engines and they may operate in series (e.g., as in an extended range electric vehicle), in parallel, or some combination of series and parallel operation.

The EV 102 may be operatively connected for computer communication to a remote server 108 via a wireless communication network (network) 110. The EV 102 may transmit and receive data (e.g., vehicle identification data, state of charge data, energy cost data, charging commands/signals) to and from the remote server 108, and vice versa, through the network 110. The remote server 108 may be a remote server or a device remote (e.g., off-board) from the EV 102.

In the exemplary embodiment of FIG. 1, the system 100 may include an electric vehicle supply equipment (EVSE) 112 may be configured to connect to the EV 102 to supply electric power to the EV 102 based on a duty cycle pattern (illustrated in FIG. 5) that pertains to the supply of AC power from the EVSE 112 to the EV 102. The EVSE 112 may connect to the EV 102 through a charging link 114. Accordingly, during activation of a charging event, the EVSE 112 may be configured to provide power to replenish one or more electric storage mechanism (e.g., the battery 106) of the EV 102. The system architectures of the EV 102, the remote server 108, and the EVSE 112 will be discussed in more detail herein with reference to FIGS. 2, 3, and 4.

In one embodiment, the EVSE 112 may be operably connected for computer communication with the EV 102 and/or the remote server 108, for example, to transmit and receive data including, but not limited to, one or more duty cycle patterns, a vehicle identification number (VIN) of the EV 102, an EVSE identification designation (EVSE ID) (e.g., identification number, serial number, alpha-numeric code, EVSE name) of the EVSE 112, charging parameters associated with the EVSE 112, charging parameters associated with the EV 102, charging data/feedback, vehicle system data, and the like to and from the EV 102 and/or the remote server 108.

The charging link 114 may be a wired or wireless link to the EVSE 112 Computer communication may occur also via the charging link 114 and/or a wired or wireless communication link. In some configurations, the EV 102, the EVSE 112 and/or the charging link 114 may be operably controlled to initiate or terminate charging of the EV 102 from the EVSE 112 based on one or more charging schedules that are implemented within the system 100.

In one or more embodiments, the EVSE 112 may be installed at a residential home or outside a residential home, for example, at a public (e.g., non-networked) or private (e.g., networked) charging station. The EVSE 112 may include a respective EVSE ID that may be used to identify the particular EVSE 112. The EVSE ID may be associated with a manufacturer, model, and/or configuration of the EVSE 112. As discussed below, the EVSE ID may be utilized by a manufacturer, OEM, and/or third-party to identify manufacturer, model, and/or configuration of the EVSE 112 that is utilized to charge the EV 102 based on encrypted data included within the duty cycle pattern that may be communicated by the remote server 108, the EVSE 112, and/or the EV 102.

In an exemplary embodiment, the EV 102, the EVSE 112, and/or the remote server 108 may be configured to execute a charging identification application 118. The charging identification application 118 may be configured to identify a manufacturer, model, and/or configuration of the EV 102 to identify the particular EV 102 based on the generation of a duty cycle pattern that pertains to the electric vehicle charging of the EV 102. The charging identification application 118 may additionally or alternatively be configured to identify a manufacturer, model, and/or configuration of the EVSE 112 based on the generation of a duty cycle pattern that pertains to the electric vehicle charging of the EV 102 by the EVSE 112.

In an exemplary embodiment, the charging identification application 118 may be configured to communicate with the charging link 114, the EV 102, and/or the EVSE 112 to receive a charging command to initiate AC electric charging of the EV 102 by the EVSE 112 through the charging link 114. The charging identification application 118 may be configured to generate a duty cycle pattern that may pertain to the electric charging of the EV 102. The duty cycle pattern may be generated with an encrypted data packet that may include a VIN of the EV 102 and/or the EVSE ID of the EVSE 112.

As discussed in more detail below, the charging identification application 118 may be configured to communicate the duty cycle pattern with the encrypted data packet to the EVSE 112 and/or the EV 102. The charging identification application 118 may also be configured to retrieve a pre-stored VIN from the EV 102 and/or a pre-stored EVSE ID 314 from the EVSE 112 upon charging of the EV 102 by the EVSE 112.

The charging identification application 118 may be configured to compare the VIN and/or EVSE ID that is encrypted within the data packet of the duty cycle pattern with the pre-stored VIN and/or the pre-stored EVSE ID to identify the EV 102 and/or EVSE 112 as one that matches. If a match is determined between the VIN included within the data packet and the pre-stored VIN, the charging identification application 118 may be configured to identify the EV 102 which may be manufactured, maintained, and/or owned by a stakeholder (e.g., OEM, dealer, third-party organization). Alternatively, if a match is not determined between the VIN included within the data packet and the pre-stored VIN, the charging identification application 118 may be configured to identify the EV 102 as being a vehicle that may not be manufactured, maintained, and/or owned by the stakeholder.

With respect to the identification of the EVSE 112, if a match is determined between the EVSE ID included within the data packet and the pre-stored EVSE ID 314, the charging identification application 118 may be configured to identify the EVSE 112 which may be manufactured, maintained, and/or owned by a stakeholder (e.g., EVSE manufacturer, dealer, third-party organization). Alternatively, if a match is not determined between the EVSE ID included within the data packet and the pre-stored EVSE ID 314, the charging identification application 118 may be configured to identify the EVSE 112 as charging infrastructure that may not be manufactured, maintained, and/or owned by the stakeholder.

The charging identification application 118 may provide an improvement in the technology of electric vehicle charging by utilizing the duty cycle and generating a unique duty cycle pattern that may be utilized to identify the EV 102 and/or the EVSE 112 through alternating current electric vehicle charging as being manufactured by a particular manufacturer, pertaining to a particular model, and/or pertaining to a specific configuration (e.g., hardware configuration). Such information may enable customized charging patterns, maintenance planning, charging schedules, life cycle planning, charging configurations, grid stability, load control, cost savings, depreciation determination, demand response planning, and the like that may be utilized with respect to the EVSE 112 and/or the EV 102.

Figure 2:
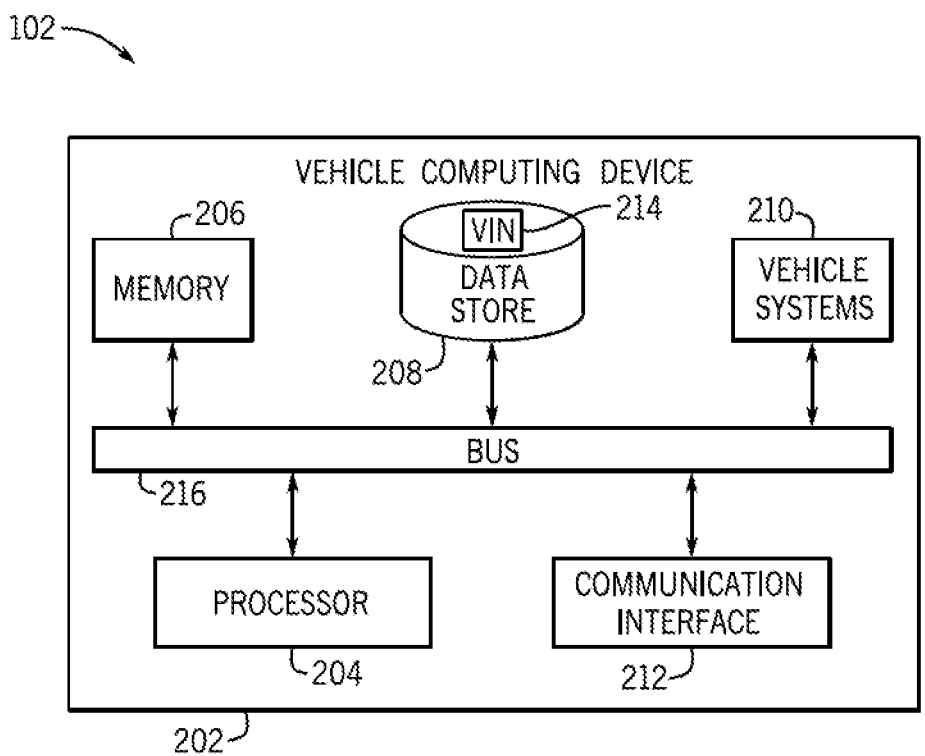
FIG. 2 is a schematic view of an illustrative electric vehicle architecture according to an exemplary embodiment of the present disclosure.

Referring now to FIG. 2, a schematic view of an illustrative electric vehicle architecture, for example the EV 102 of FIG. 1, is shown according to an exemplary embodiment. In particular, the EV 102 may include a vehicle computing device 202 (e.g., a telematics unit, an electronic control unit) with provisions for processing, communicating and interacting with various components of the EV 102 and other components of the system 100. The vehicle computing device 202 may include a processor 204, a memory 206, a data store 208, a plurality of vehicle systems 210 (e.g., including the electric motor 104, the battery 106) and a communication interface 212. The components of the EV 102, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV 102 may include other components and systems not shown.

The data store 208 may store application data that may also include data pertaining to the charging identification application 118. In an exemplary embodiment, the data store 208 of the vehicle computing device 200 of the EV 102 may be pre-populated with vehicle identification data. The pre-populated vehicle identification data may include, but may not be limited to, a pre-stored VIN 214 of the EV 102, a pre-populated manufacturer information (not shown) of the EV 102, a pre-populated model name/number (not shown) of the EV 102, and/or one or more pre-populated component codes (not shown) that may be associated with one or more components of the EV 102 (e.g., battery 106, the electric motor 104).

The communication interface 212 of the EV 102 may be configured as a telematics control unit and may provide software, firmware and/or hardware to facilitate data input and output between the components of the vehicle computing device 202 and other components, networks and data sources. The communication interface 212 may facilitate communication between the EV 102 and the remote server 108 through the network 110. Additionally, the communication interface 212 may facilitate communication between the EV 102 and the EVSE 112 through the network 110 and/or the charging link 114 between the EV 102 and the EVSE 112. As discussed below, the charging link 114 may facilitate communications of the duty cycle pattern between the remote server 108 and the EV 102 and/or between the EVSE 112 and the EV 102 based on the execution of the charging identification application 118.

Figure 3:
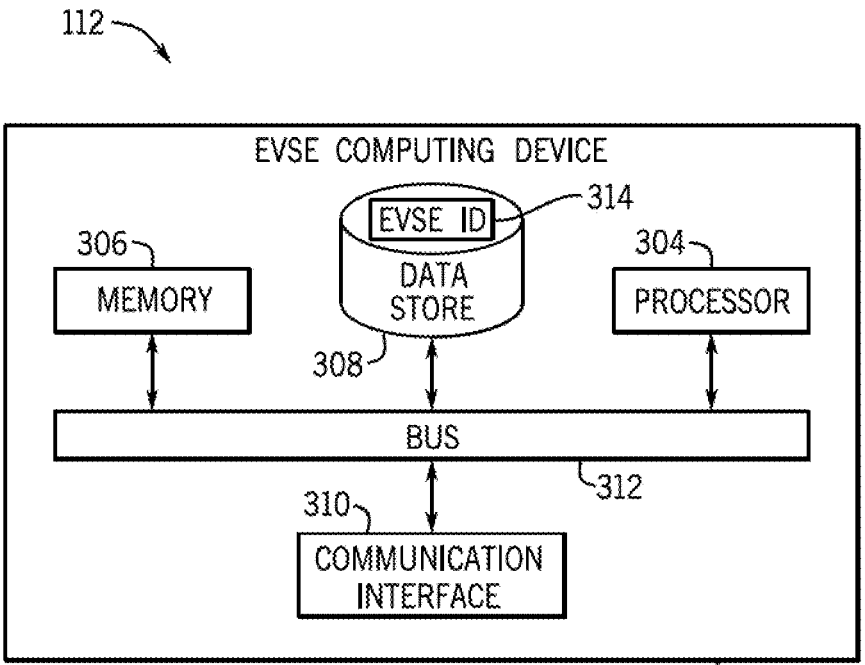
FIG. 3 is a schematic view of a computing device of an electric vehicle supply equipment (EVSE) according to an exemplary embodiment of the present disclosure.

Referring now to FIG. 3, a schematic view of a computing device of the EVSE 112 of FIG. 1, is shown according to an exemplary embodiment. The EVSE 112 may be maintained by an Original Equipment Manufacturer (OEM) (e.g., of the EV 102 and/or the EVSE 112), a third-party that maintains, leases, and/or manages the EV 102 and/or the EVSE 112, a utility provider, a regulatory body, among others. In FIG. 3, the EVSE 112 may include an EVSE computing device 302 that may further include a processor 304, a memory 306, a data store 308 and a communication interface 310.

The components of EVSE 118, including the computing device 302, may be operably connected for computer communication via a bus 312 and/or other wired and wireless technologies. The computing device 302 as well as the EVSE 112 may include other components and systems not shown. The data store 308 of the EVSE 112 may store application data that may also include data pertaining to the charging identification application 118. In an exemplary embodiment, the data store 308 of the EVSE 112 may be pre-populated with EVSE identification data. The pre-populated EVSE identification data may include, but may not be limited to, a pre-stored EVSE ID 314 of the EVSE 112, a pre-populated manufacturer information (not shown) of the EVSE 112, a pre-populated model name/number (not shown) of the EVSE 112, and/or one or more pre-populated components codes (not shown) that may be associated with one or more components of the EVSE 112 (e.g., a valve).

The communication interface 310 of the EVSE 112 may provide software, firmware and/or hardware to facilitate data input and output between the components of the EVSE 112 and other components, networks and data sources. The communication interface 310 may facilitate communication between the EVSE 112 and the remote server 108 through the network 110. Additionally, the communication interface 310 may facilitate communication between the EVSE 112 and the EV 102 through the network 110 and/or the charging link 114 between the EVSE 112 and the EV 102. As discussed below, the charging link 114 may facilitate communications of the duty cycle pattern between the remote server 108 and the EV 102 and/or between the EVSE 112 and the EV 102 based on the execution of the charging identification application 118.

Figure 4:
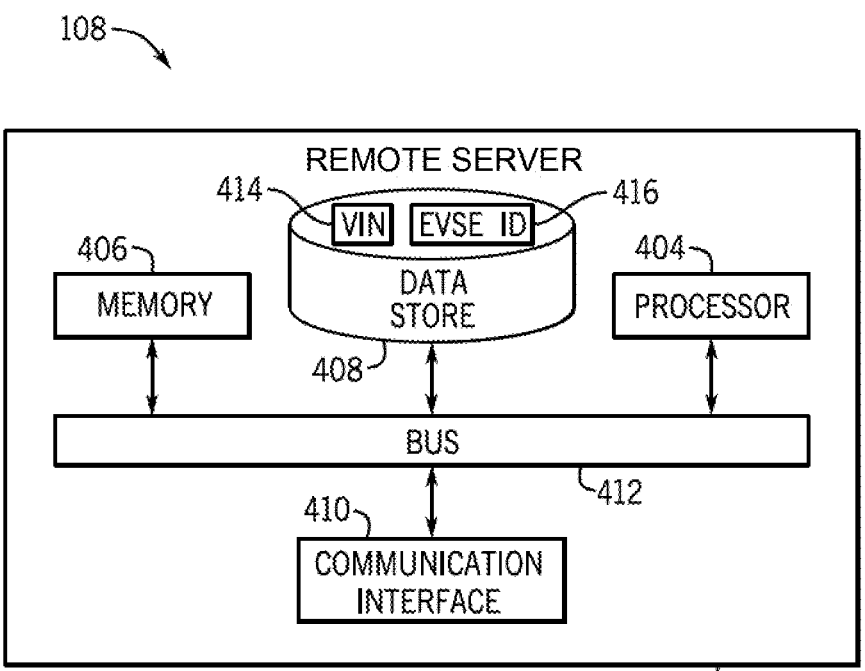
FIG. 4 is a schematic view of a remote server according to an exemplary embodiment of the present disclosure.

Referring now to FIG. 4, a schematic view of the remote server 108 of FIG. 1, is shown according to an exemplary embodiment. The remote server 108, is located remotely (i.e., off-board) from the EV 102 and/or the EVSE 112 and, in some embodiments may be maintained by an Original Equipment Manufacturer (OEM) (e.g., of the EV 102), a manufacturer of the EVSE 112, a third-party that maintains, leases, and/or manages the EV 102 and/or the EVSE 112, a utility provider, a regulatory body, among others. Additionally, in some embodiments, the remote server 108 may be another type of remote device or supported by a cloud architecture.

In FIG. 4, the remote server 108 may include a computing device 402 that may further include a processor 404, a memory 406, a data store 408, and a communication interface 410. The components of the architecture 400, including the computing device 402, may be operably connected for computer communication via a bus 412 and/or other wired and wireless technologies. The computing device 402 as well as the remote server 108 may include other components and systems not shown.

The data store 408 may store application data that may also include data pertaining to the charging identification application 118. In an exemplary embodiment, the data store 408 may be configured to store identification data associated with the EV 102 that may be manufactured, owned, operated, leased, maintained, and/or associated with one or more particular stakeholders (e.g., OEM). In particular, the data store 408 may be configured to store the VIN 414 of the EV 102. As discussed below, the charging identification application 118 may be configured to access the data store 408 to retrieve the VIN 414 of the EV 102. The charging identification application 118 may include the VIN 414 within an encrypted data packet that may be included within the duty cycle pattern generated by the charging identification application 118.

In another embodiment, the data store 408 may be configured to store identification data associated with the EVSE 112 that may be manufactured, owned, operated, leased, maintained, and/or associated with one or more particular stakeholders (e.g., EVSE manufacturer). In particular, the data store 408 may be configured to store the EVSE ID 416 of the EVSE 112. As discussed below, the charging identification application 118 may be configured to access the data store 308 to retrieve the EVSE ID 426 of the EVSE 112. The charging identification application 118 may include the EVSE ID 416 within an encrypted data packet that may be included within the duty cycle pattern generated by the charging identification application 118.

The communication interface 410 of the computing device 402 may be configured to provide software, firmware and/or hardware to facilitate data input and output between the components of the computing device 302 and other components, networks and data sources. The communication interface 310 may be used to communicate with the EV 102, the EVSE 112, and/or other components of system 100.

Figure 5:
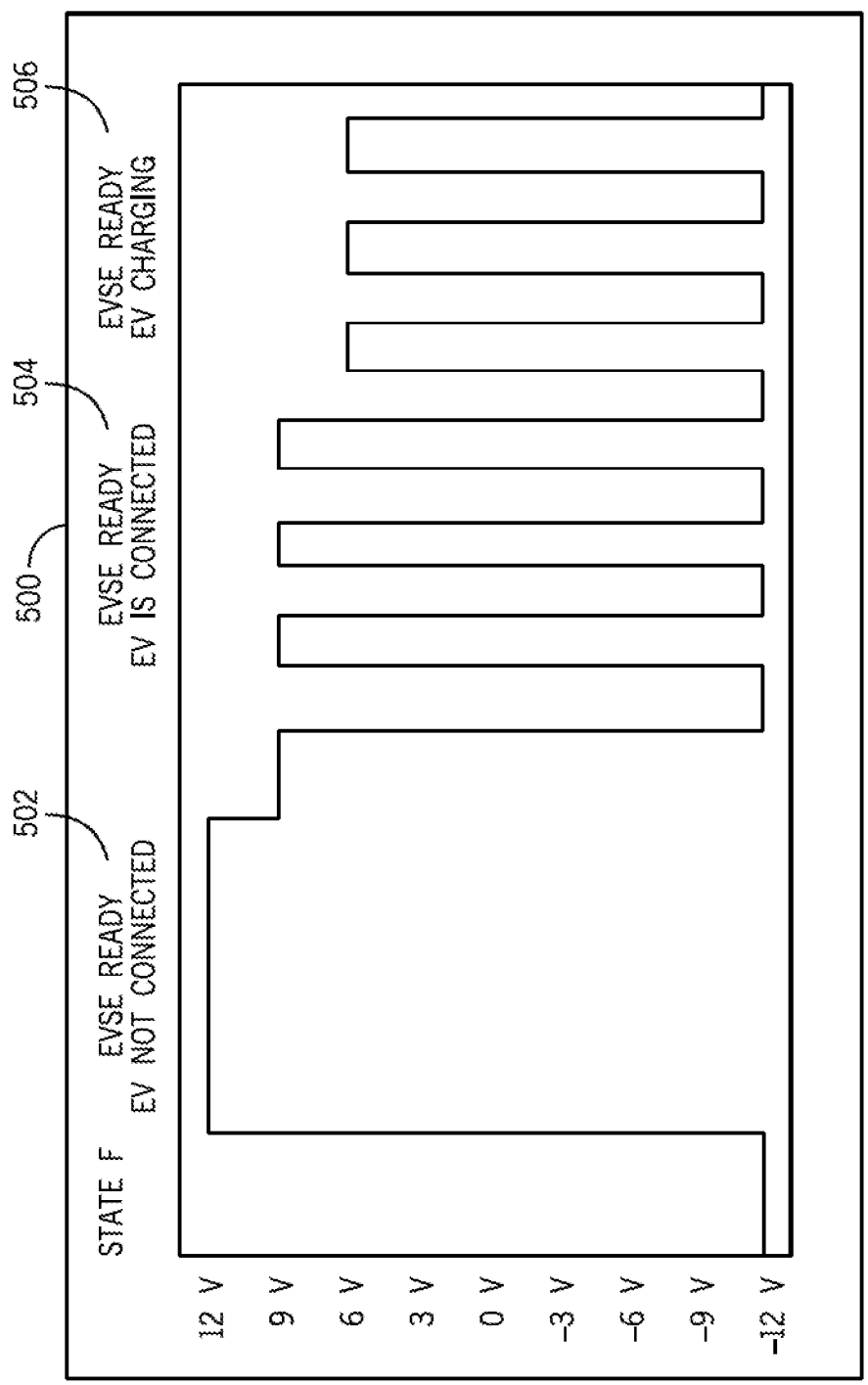
FIG. 5 is an illustrative example of a duty cycle pattern that is associated with charging states of the EVSE and the EV according to an exemplary embodiment of the present disclosure.

FIG. 5 is an illustrative example of a duty cycle pattern 500 that is associated with charging states of the EVSE 112 and the EV 102 according to an exemplary embodiment of the present disclosure. As shown in FIG. 5, the duty cycle pattern 500 may be generated with a plurality of charging states 502-506 that pertain to a maximum and minimum voltage that are utilized by the EVSE 112. In an exemplary embodiment, the duty cycle pattern 500 may be generated with a first state 502 that may pertain to a disconnected state of the EV 102 from the EVSE 112. In particular, the first state 502 may pertain to a state when there is no connection of the charging link 114 between the EVSE 112 and the EV 102. As shown, within the first state 502 a maximum voltage may be 12 V and may transition to 9 V prior to starting a second state 504.

The duty cycle pattern 500 may be generated with the second state 504 that may pertain to a connected state of the EV 102 and the EVSE 112. In particular, the second state 504 may pertain to a state when there is an active connection of the charging link 114 between the EVSE 112 and the EV 102 prior to the charging of the EV 102 by the EVSE 112. In other words, the second state 504 may be enabled upon the connection of the charging link 114 between the EVSE 112 and the EV 102 prior to the provision of charging power from the EVSE 112 to the EV 102. As shown, within the second state 504 a maximum voltage may be 12 V and this may fluctuate during the second state 504 to −12 V.

The duty cycle pattern 500 may be generated with a third state 506 that may pertain to a charging state of the EV 102 and the EVSE 112. In particular, the third state 506 may pertain to a state when there is an active charging of the battery 106 of the EV 102 by the EVSE 112 through the charging link 114. In other words, the third state 506 may be enabled upon the EVSE 112 providing charging power to the EV 102 through the charging link 114. As shown, within the third state 506 a maximum voltage may be 9 V and this may fluctuate during the third state 506 to −12 V.

In an exemplary embodiment, upon generating the duty cycle pattern 500, the charging identification application 118 may be configured to access the data store 408 of the computing device 402 of the remote server 108 to retrieve the VIN 414 of the EV 102 and/or the EVSE ID 416 of the EVSE 112 stored upon the data store 408. Upon retrieval of the VIN 414 and/or the EVSE ID 416, the charging identification application 118 may be configured to process an encrypted data packet.

Figure 6:
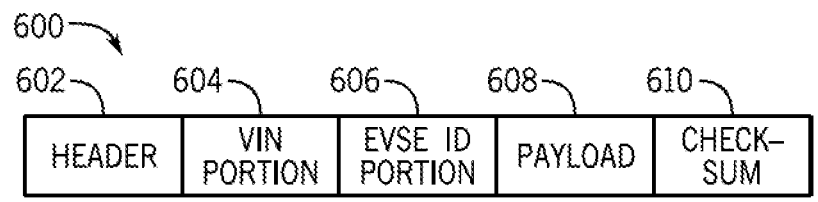
FIG. 6 is an illustrative example of an encrypted data packet that is included within the duty cycle pattern according to an exemplary embodiment of the present disclosure.

As shown in FIG. 6, as an illustrative example, the encrypted data packet 600 may be processed with a plurality of portions that may include, but may not be limited to, a header portion 602, a VIN portion 604, an EVSE ID portion 606, a payload portion 608, and a check-sum portion 610. It is appreciated that the encrypted data packet 600 shown in FIG. 6 is for illustrative exemplary purposes and that the encrypted data packet 600 may include alternative portions. In one configuration, the header portion 602 may include control information that is sent at the start of each encrypted data packet 600. The payload portion 608 may include data that may be associated with charging of the EV 102 and/or charging power provided by the EVSE 112 during each charging session. Additionally, the check-sum portion 610 may include may be utilized as a trailer of the encrypted data packet 600 and may include a check-sum as a value that represents the number of bits in the encrypted data packet 600.

In one embodiment, upon retrieval of the VIN 414 and/or the EVSE ID 416 from the data store 408 of the remote server 108, the charging identification application 118 may be configured input the VIN 414 of the EV 102 within the VIN portion 604 and/or the EVSE ID 416 of the EVSE 112 within the EVSE ID portion 606 of the encrypted data packet 600. Accordingly, the VIN portion 604 may include the VIN 414 of the EV 102 as stored upon the data store 408 of the computing device 402 by one or more particular stakeholders and the EVSE ID portion 606 may include the EVSE ID 416 of the EVSE 112 as stored upon the data store 408 of the computing device 402 by one or more particular stakeholders.

In some embodiments, upon retrieval of the pre-stored VIN 214 and/or the pre-stored EVSE ID 314 from the respective data stores 208, 308 of the EV 102 and the EVSE 112, the charging identification application 118 may be configured input the pre-stored VIN 214 of the EV 102 within the VIN portion 604 and/or the pre-stored EVSE ID 314 of the EVSE 112 within the EVSE ID portion 606 of the encrypted data packet 600. Accordingly, the VIN portion 604 may include the pre-stored VIN 214 of the EV 102 as stored upon the data store 308 of the vehicle computing device 202 and the EVSE ID portion 606 may include the pre-stored EVSE ID 314 of the EVSE 112 as stored upon the data store 308 of the EVSE computing device 302.

In one or more embodiments, upon processing of the encrypted data packet 600, the charging identification application 118 may be configured to include the encrypted data packet 600 within the duty cycle pattern 500 that includes the plurality of charging states 502-506 of the EVSE 112 and the EV 102. In particular, in some embodiments, the charging identification application 118 may be configured to include the encrypted data packet 600 within the second state 504 of the duty cycle pattern 500 such that it is included upon the connection of the charging link 114 between the EVSE 112 and the EV 102 prior to the provision of charging power from the EVSE 112 to the EV 102.

In additional embodiments, the charging identification application 118 may be configured to include the encrypted data packet 600 within the third state 506 of the duty cycle pattern 500 such that it is included upon the EVSE 112 providing charging power to the EV 102 through the charging link 114. In one or more embodiments, the charging identification application 118 may be configured to include respective encrypted data packet 600 within both the second state 504 and the third state 506 of the duty cycle pattern 500. For example, the charging identification application 118 may be configured to include a first encrypted data packet within the second state 504 that includes the VIN 414 and/or the pre-stored VIN 214 within the VIN portion 604 of the first encrypted data packet and a second encrypted data packet within the third state 506 that includes the EVSE ID 416 and/or the pre-stored EVSE ID 314 within the EVSE ID portion 606 of the second encrypted data packet.

II. The Charging Identification Application and Related Methods

Figure 7:
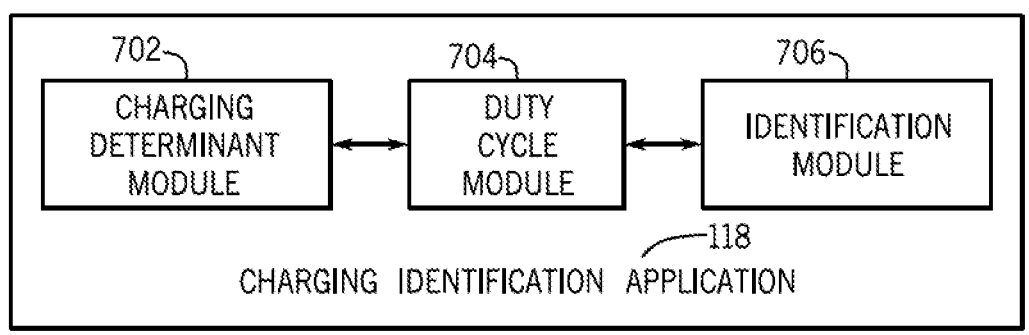
FIG. 7 is a schematic view of the charging identification application according to an exemplary embodiment of the present disclosure.

FIG. 7 is a schematic view of the charging identification application 118 according to an exemplary embodiment of the present disclosure. As shown, the charging identification application 118 may include various modules for identifying the EV 102 and/or the EVSE 112 through an alternating current electric charging of the EV 102 by the EVSE 112. In an exemplary embodiment, the charging identification application 118 may include a charging determinant module 702, a duty cycle module 704, and an identification module 706. However, it is appreciated that the charging identification application 118 may include one or more additional modules and/or sub-modules that are included in lieu of the modules 702-706. Exemplary methods executed by the modules 702-706 of the charging identification application 118 will now be discussed.

Figure 8:
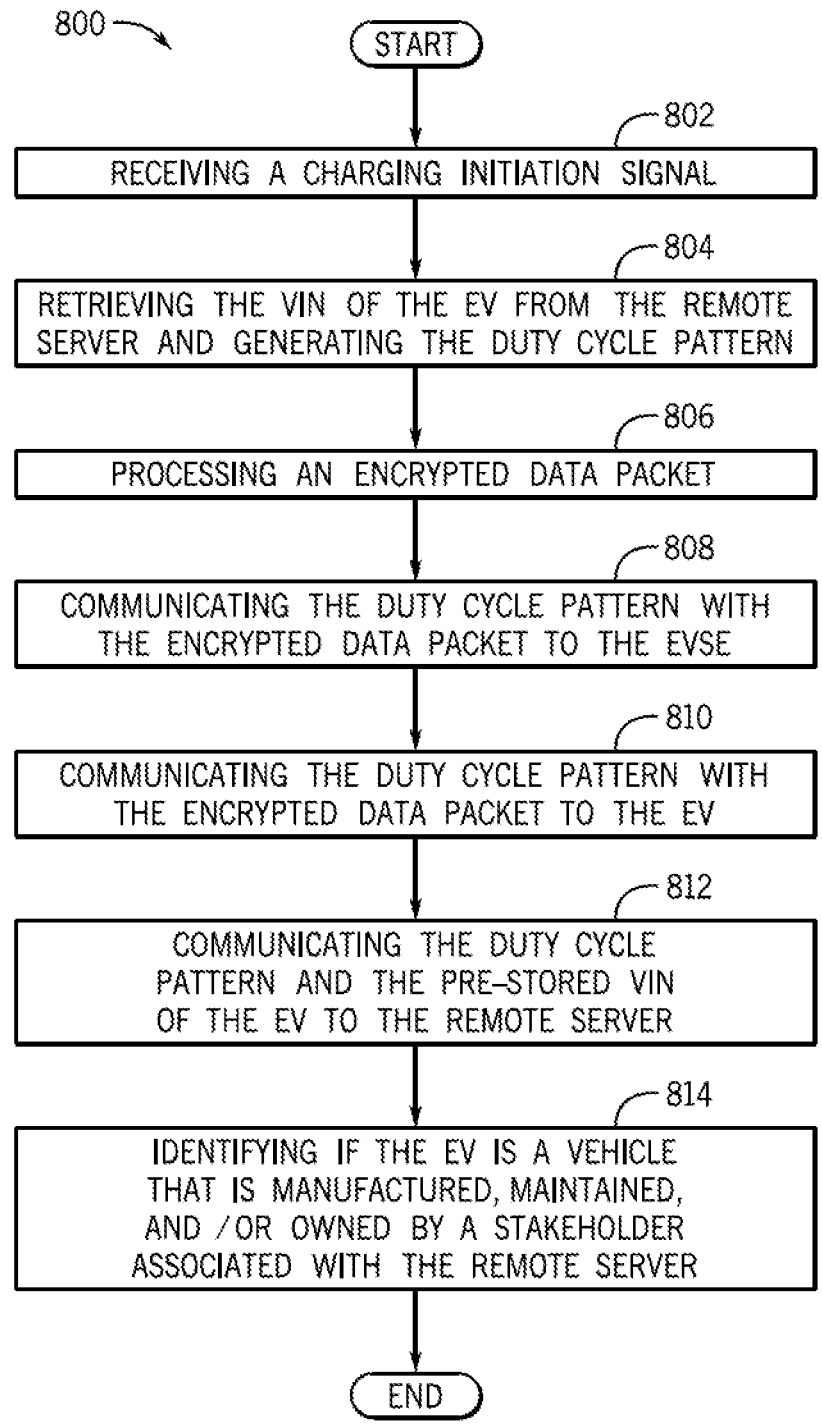
FIG. 8 is a process flow diagram of a method for identifying the EV through the AC electric charging of the EV by the EVSE according to an exemplary embodiment of the present disclosure.

FIG. 8 is a process flow diagram of a method 800 for identifying the EV 102 through the AC electric charging of the EV 102 by the EVSE 112 according to an exemplary embodiment of the present disclosure. FIG. 8 will be described with reference to the components of FIGS. 1-7 though it is to be appreciated that the method 800 of FIG. 8 may be used with other systems and/or components. The method 800 may begin at block 802, wherein the method 800 may include receiving a charging initiation signal.

In an exemplary embodiment, the charging determinant module 702 may be configured to communicate with the EV 102 through the communication interface 212 of the EV 102 to determine if the charging link 114 is connected to the EV 102. Upon connection of the charging link 114 from the EVSE 112 to the EV 102, the processor 204 of the vehicle computing device 200 may be configured to send a charging initiation signal to the charging determinant module 702. Accordingly, the charging determinant module 702 may determine that the EV 102 is connected to the EVSE 112 through the charging link 114 and the EVSE 112 is ready to charge the EV 102.

The method 800 may proceed to block 804, wherein the method 800 may include retrieving the VIN 414 of the EV 102 from the remote server 108 and generating the duty cycle pattern 500. In an exemplary embodiment, upon determining that the EV 102 is connected to the EVSE 112 through the charging link 114, the charging determinant module 702 may be configured to send respective data regarding the connection of the EV 102 to the EVSE 112 to the duty cycle module 704. The duty cycle module 704 may be configured to generate the duty cycle pattern 500.

The duty cycle pattern 500 may be generated with a plurality of charging states 502-506 that pertain to a maximum and minimum voltage that are utilized by the EVSE 112 before charging the EV 102, during connection of the EV 102 to the EVSE 112 prior to charging the EV 102, and during charging of the EV 102 by the EVSE 112. As discussed above, the VIN 414 of the EV 102 may be (previously) stored upon the data store 408 of the remote server 108. In an exemplary embodiment, the duty cycle module 704 may be configured to access the data store 408 of the computing device 402 of the remote server 108 and may retrieve the VIN 414 of the EV 102 from the data store 408.

The method 800 may proceed to block 806, wherein the method 800 may include processing an encrypted data packet. In one embodiment, upon retrieval of the VIN 414 of the EV 102 from the data store 408, the duty cycle module 704 may be configured to process an encrypted data packet 600. As discussed above, the encrypted data packet 600 may be processed with a plurality of portions that may include, but may not be limited to, a header portion 602, a VIN portion 604, an EVSE ID portion 606, a payload portion 608, and a check-sum portion 610. In one embodiment, the duty cycle module 704 may be configured input the VIN 414 of the EV 102 within the VIN portion 604 of the encrypted data packet 600. Accordingly, the VIN portion 604 may include the VIN 414 of the EV 102 as stored upon the data store 408 of the computing device 402 by one or more particular stakeholders.

In one or more embodiments, upon processing of the encrypted data packet 600, the duty cycle module 704 may be configured to include the encrypted data packet 600 within the duty cycle pattern 500 that includes the plurality of charging states 502-506 of the EVSE 112 and the EV 102. In particular, in some embodiments, the duty cycle module 704 may be configured to include the encrypted data packet 600 within the second state 504 of the duty cycle pattern 500 such that it is included upon the connection of the charging link 114 between the EVSE 112 and the EV 102 prior to the provision of charging power from the EVSE 112 to the EV 102. In alternate embodiment, the duty cycle module 704 may be configured to alternatively or additionally include the encrypted data packet 600 within the third state 506 of the duty cycle pattern 500 such that it is included upon the active charging of the EV 102 by the EVSE 112 based on the provision of charging power from the EVSE 112 to the EV 102 through the charging link 114.

With continued reference to the method 800 of FIG. 8, the method 800 may proceed to block 808, wherein the method 800 may include communicating the duty cycle pattern 500 with the encrypted data packet 600 to the EVSE 112. In an exemplary embodiment, the duty cycle module 704 may be configured to utilize the communication interface 410 of the remote server 108 to wirelessly communicate the duty cycle pattern 500 to the EVSE 112 through the network 110.

The method 800 may proceed to block 810, wherein the method 800 may include communicating the duty cycle pattern 500 with the encrypted data packet 600 to the EV 102. In an exemplary embodiment, upon determining that the charging link 114 is connected between the EVSE 112 and the EV 102, the duty cycle module 704 may be configured to communicate the duty cycle pattern 500 that includes the encrypted data packet 600 within the second state 504 and/or the third state 506 to the EV 102. In one embodiment, the duty cycle module 704 may be configured to communicate the duty cycle pattern 500 to the EV 102 through the charging link 114. In another embodiment, the duty cycle module 704 may be configured to communicate the duty cycle pattern 500 to the EV 102 through the network 110. In one configuration, upon receipt of the duty cycle pattern 500, the duty cycle pattern 500 may be stored upon the data store 208 of the vehicle computing device 200 of the EV 102.

The method 800 may proceed to block 812, wherein the method 800 may include communicating the duty cycle pattern 500 and the pre-stored VIN 214 of the EV 102 to the remote server 108. In one embodiment, upon receipt of the duty cycle pattern 500, the duty cycle module 704 may be configured to access the data store 208 of the vehicle computing device 202 of the EV 102 to retrieve the pre-stored VIN 214 from the EV 102. The pre-stored VIN 214 may be previously stored upon the data store 208 by a stakeholder. For example, the pre-stored VIN 214 may be previously stored upon the data store 208 by an OEM.

The duty cycle module 704 may be configured to add data to the encrypted data packet 600 included within the second state 504 and/or the third state 506 of the duty cycle pattern 500 that pertains to the pre-stored VIN 214. In particular, the duty cycle module 704 may input the pre-stored VIN 214 within the VIN portion 604 of the encrypted data packet 600. Accordingly, the VIN portion 604 of the encrypted data packet 600 may be populated with the VIN 414 of the EV 102 as retrieved from the data store 408 of the remote server 108 (as populated by the stakeholder) previously included within the encrypted data packet 600 in addition to the pre-stored VIN 214 as retrieved from the data store 208 of the vehicle computing device 200.

Upon inputting the pre-stored VIN 214 within the VIN portion 604 of the encrypted data packet 600, the duty cycle module 704 may be configured to communicate the duty cycle pattern 500 that includes the encrypted data packet 600 to the remote server 108. Accordingly, the encrypted data packet 600 with the VIN portion 604 that includes the VIN of the EV 102 as retrieved from the data store 408 of the remote server 108 previously included within the encrypted data packet 600 in addition to the pre-stored VIN 214 as retrieved from the data store 208 of the vehicle computing device 200 is communicated to the remote server 108.

In an alternate embodiment, upon retrieval of the pre-stored VIN 214 from the data store 208, the duty cycle module 704 may be configured to analyze the encrypted data packet 600 to extract the VIN 414 previously inputted within the VIN portion 604 of the encrypted data packet 600. The duty cycle module 704 may be configured to process a VIN comparison report from the EV 102 that includes the VIN 414 extracted from the encrypted data packet 600 of the duty cycle pattern 500 in addition to the pre-stored VIN 214 as retrieved from the data store 208 of the EV 102.

Upon processing of the VIN comparison report, the duty cycle module 704 may be configured to communicate the VIN comparison report that includes the VIN of the EV 102 extracted from the encrypted data packet 600 of the duty cycle pattern 500 in addition to the pre-stored VIN 214 as retrieved from the data store 208 of the vehicle computing device 202 to the remote server 108. In one embodiment, upon communication of the duty cycle pattern 500 or the VIN comparison report to the remote server 108, the duty cycle module 704 may communicate respective data to the identification module 706 of the charging identification application 118 that indicates the communication of the duty cycle pattern 500 or the VIN comparison report from the EV 102 to the remote server 108.

The method 800 may proceed to block 814, wherein the method 800 may include identifying if the EV 102 is a vehicle that is manufactured, maintained, and/or owned by a stakeholder associated with the remote server 108. In an exemplary embodiment, if the remote server 108 receives the duty cycle pattern 500 that is communicated from the EV 102 (at block 810), the identification module may be configured to enable the processor 404 of the remote server 108 to analyze the duty cycle pattern 500 to compare the VIN 414 previously inputted within the VIN portion 604 of the encrypted data packet 600 with the pre-stored VIN 214 inputted within the encrypted data packet 600 by the duty cycle module 704 (at block 810).

In particular, the processor 404 may be configured to analyze the encrypted data packet 600 to extract the VIN 414 that was retrieved from the data store 408 of the remote server 108 and previously inputted within the VIN portion 604 (at block 804). Additionally, the processor 404 may be configured to extract the pre-stored VIN 214 that was inputted from the data store 208 of the EV 102 within the encrypted data packet 600 (at block 812). Upon extraction of the previously inputted VIN and the pre-stored VIN 214 from the VIN portion 604 of the encrypted data packet 600, the identification module 706 may be configured to compare the VIN 414 that was retrieved from the data store 408 of the remote server 108 and previously encrypted within the encrypted data packet 600 (at block 804) of the duty cycle pattern 500 with the pre-stored VIN 214 to identify the EV 102 and/or EVSE 112 as one that matches.

If the identification module 706 determines that there is a match between the VIN 414 previously inputted within the VIN portion 604 (at block 804) and the pre-stored VIN 214 that was inputted from the data store 208 of the EV 102 within the encrypted data packet 600 (at block 812), the identification module 706 may be configured to identify the EV 102 which may be manufactured, maintained, and/or owned by a stakeholder (e.g., OEM, dealer, third-party organization).

Alternatively, if a match is not determined between the VIN 414 previously inputted within the VIN portion 604 (at block 804) and the pre-stored VIN 214 that was inputted from the data store 208 of the EV 102 within the encrypted data packet 600 (at block 812), the identification module 706 may be configured to identify the EV 102 as being a vehicle that may not be manufactured, maintained, and/or owned by the stakeholder.

In an alternate embodiment, if the remote server 108 receives the VIN comparison report that is communicated from the EV 102 (at block 812) that includes the VIN 414 extracted from the encrypted data packet 600 of the duty cycle pattern 500 (inputted to the encrypted data packet 600 at block 804) in addition to the pre-stored VIN 214 as retrieved from the data store 208 of the EV 102 (at block 812), the identification module 706 may be configured to compare the VIN 414 that was retrieved from the data store 408 of the remote server 108 and previously encrypted within the encrypted data packet 600 (at block 804) of the duty cycle pattern 500 with the pre-stored VIN 214 to identify the EV 102 as one that matches.

If the identification module 706 determines that there is a match between the VIN 414 previously inputted within the VIN portion 604 and the pre-stored VIN 214 that was inputted from the data store 208 of the EV 102 within the encrypted data packet 600 that are included within the VIN comparison report, the identification module 706 may be configured to identify the EV 102 which may be manufactured, maintained, and/or owned by a stakeholder (e.g., OEM, dealer, third-party organization). Alternatively, if a match is not determined between the VIN 414 previously inputted within the VIN portion 604 and the pre-stored VIN 214 that was inputted within the VIN portion 604 (at block 812), the identification module 706 may be configured to identify the EV 102 as being a vehicle that may not be manufactured, maintained, and/or owned by the stakeholder.

In one configuration, if the identification module 706 identifies the EV 102 as being manufactured, maintained, and/or owned by a stakeholder, the identification module 706 may be configured to communicate with the processor 304 of the EVSE computing device 302 of the EVSE 112 to control the EVSE 112 to provide charging power to the EV 102 through the charging link 114. Accordingly, the EVSE 112 may be controlled to provide charging power and the EV 102 may be controlled to receive charging power to charge the battery 106 of the EV 102 based on the identification of the EV 102 as being manufactured, maintained, and/or owned by a stakeholder. In additional configurations, the identification of the EV 102 as being manufactured, maintained, and/or owned by a stakeholder may be used to provide customized charging patterns, maintenance planning, charging schedules, life cycle planning, charging configurations, grid stability, load control, cost savings, depreciation determination, demand response planning, and the like that may be utilized with respect to the EVSE 112 and/or the EV 102.

Figure 9:
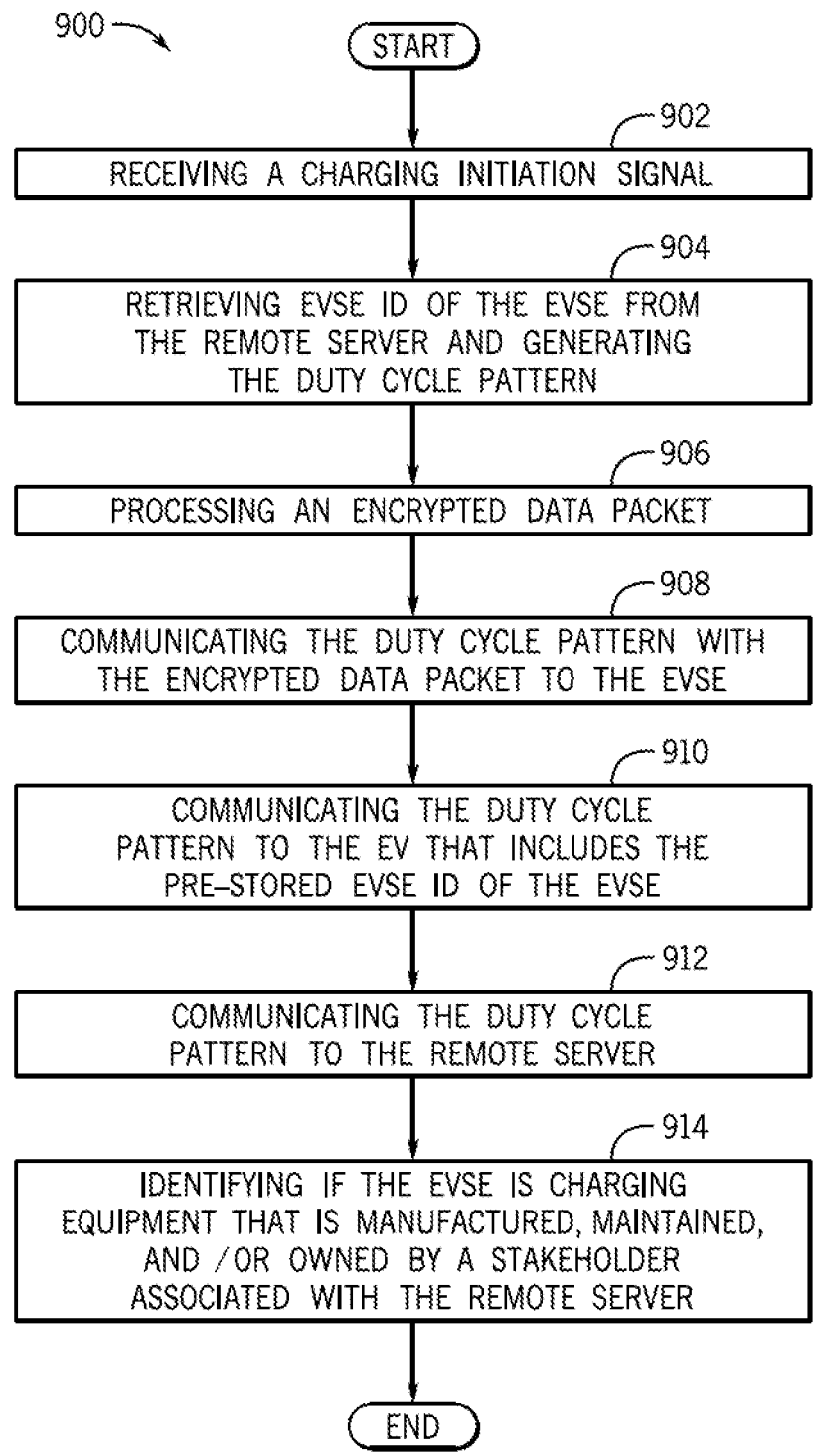
FIG. 9 is a process flow diagram of a method for identifying the EVSE through the alternating current electric charging of the EV by the EVSE according to an exemplary embodiment of the present disclosure.

FIG. 9 is a process flow diagram of a method 900 for identifying the EVSE 112 through the alternating current electric charging of the EV 102 by the EVSE 112 according to an exemplary embodiment of the present disclosure. FIG. 9 will be described with reference to the components of FIGS. 1-7 though it is to be appreciated that the method 900 of FIG. 9 may be used with other systems and/or components. The method 900 may begin at block 902, wherein the method 900 may include receiving a charging initiation signal.

In one embodiment, the charging determinant module 702 may be configured to communicate with the EVSE 112 to determine if the charging link 114 is connected from the EVSE 112 to the EV 102. Upon connection of the charging link 114 from the EVSE 112 to the EV 102, the EVSE 112 may receive a signal indicating the connection of the charging link 114 to the EV 102. The EVSE 112 may be configured to send the charging initiation signal to the charging determinant module 702. Accordingly, the charging determinant module 702 may determine that the EV 102 is connected to the EVSE 112 through the charging link 114 and the EVSE 112 is ready to charge the EV 102.

The method 900 may proceed to block 904, wherein the method 900 may include retrieving EVSE ID 416 of the EVSE 112 from the remote server 108 and generating the duty cycle pattern. In an exemplary embodiment, upon determining that the EV 102 is connected to the EVSE 112 through the charging link 114, the charging determinant module 702 may be configured to send respective data regarding the connection of the EV 102 to the EVSE 112 to the duty cycle module 704. The duty cycle module 704 may be configured to generate the duty cycle pattern 500. As discussed above, the EVSE ID 416 of the EVSE 112 may be (previously) stored upon the data store 408 of the remote server 108. In an exemplary embodiment, the duty cycle module 704 may be configured to access the data store 408 of the remote server 108 and may retrieve the previously stored EVSE ID 314 of the EVSE 112 from the data store 408.

The method 900 may proceed to block 906, wherein the method 900 may include processing an encrypted data packet. In one embodiment, upon retrieval of the EVSE ID 416 of the EVSE 112 from the data store 408, the duty cycle module 704 may be configured to process an encrypted data packet 600. The duty cycle module 704 may be configured input the EVSE ID 416 of the EVSE 112 within the EVSE ID portion 606 of the encrypted data packet 600. Accordingly, the EVSE ID portion 606 may include the EVSE ID 416 of the EVSE 112 as stored upon the data store 408 of the computing device 402 by one or more particular stakeholders.

In one or more embodiments, upon processing of the encrypted data packet 600, the duty cycle module 704 may be configured to include the encrypted data packet 600 within the duty cycle pattern 500 that is associated with a charging states of the EVSE 112 and the EV 102. In particular, in some embodiments, the duty cycle module 704 may be configured to include the encrypted data packet 600 within the second state 504 of the duty cycle pattern 500 such that it is included upon the connection of the charging link 114 between the EVSE 112 and the EV 102 prior to the provision of charging power from the EVSE 112 to the EV 102. In alternate embodiment, the duty cycle module 704 may be configured to alternatively or additionally include the encrypted data packet 600 within the third state 506 of the duty cycle pattern 500 such that it is included upon the active charging of the EV 102 by the EVSE 112 based on the provision of charging power from the EVSE 112 to the EV 102 through the charging link 114.

With continued reference to the method 900 of FIG. 9, the method 900 may proceed to block 908, wherein the method 900 may include communicating the duty cycle pattern 500 with the encrypted data packet to the EVSE 112. In an exemplary embodiment, the duty cycle module 704 may be configured to utilize the communication interface 310 of the remote server architecture 300 to wirelessly communicate the duty cycle pattern 500 to the EVSE 112 through the network 110.

The method 900 may proceed to block 910, wherein the method 900 may include communicating the duty cycle pattern 500 to the EV 102 that includes the pre-stored EVSE ID 314 of the EVSE 112. In an exemplary embodiment, upon determining that the EVSE 112 is connected to the EV 102 through the charging link 114, the duty cycle module 704 may be configured to retrieve the pre-stored EVSE ID 314 from the data store 308 of the EVSE 112. The duty cycle module 704 may additionally be configured to add data to the encrypted data packet 600 included within the second state 504 and/or the third state 506 of the duty cycle pattern 500 that pertains to the pre-stored EVSE ID 314 that may be stored upon the EVSE 112.

In particular, the duty cycle module 704 may input the pre-stored EVSE ID 314 stored upon the EVSE 112 within the EVSE ID portion 606 of the encrypted data packet 600. Accordingly, the EVSE ID portion 606 of the encrypted data packet 600 may be populated with the EVSE ID 416 of the EVSE 112 as retrieved from the data store 408 of the remote server 108 (as populated by the stakeholder) previously included within the encrypted data packet 600 in addition to the pre-stored EVSE ID 314 as retrieved from the EVSE 112.

Upon inputting the pre-stored EVSE ID 314 within the EVSE ID portion 606 of the encrypted data packet 600, the duty cycle module 704 may be configured to communicate the duty cycle pattern 500 that includes the encrypted data packet 600 to the remote server 108. Accordingly, the encrypted data packet 600 with the EVSE ID portion 606 that includes the EVSE ID 416 of the EVSE 112 as retrieved from the data store 408 of the remote server 108 previously included within the encrypted data packet 600 in addition to the pre-stored EVSE ID 314 as retrieved from the data store 308 of the EVSE computing device 302 is communicated to the remote server 108.

In one embodiment, the duty cycle module 704 may be configured to communicate the duty cycle pattern 500 from the EVSE 112 to the EV 102 through the charging link 114. In another embodiment, the duty cycle module 704 may be configured to communicate the duty cycle pattern 500 from the EVSE 112 to the EV 102 through the network 110. In one configuration, upon receipt of the duty cycle pattern 500, the duty cycle pattern 500 may be stored upon the data store 208 of the vehicle computing device 202 of the EV 102.

The method 900 may proceed to block 912, wherein the method 900 may includes communicating the duty cycle pattern 500 to the remote server 108. In one embodiment, upon inputting the pre-stored EVSE ID 314 within the EVSE ID portion 606 of the encrypted data packet 600, the duty cycle module 704 may be configured to communicate the duty cycle pattern 500 that includes the encrypted data packet 600 to the remote server 108. Accordingly, the encrypted data packet 600 with the EVSE ID portion 606 that includes the EVSE ID 416 of the EVSE 112 as retrieved from the data store 408 of the remote server 108 previously included within the encrypted data packet 600 in addition to the pre-stored EVSE ID 314 as retrieved from the data store 308 of the EVSE computing device 302 is communicated to the remote server 108.

The method 900 may proceed to block 914, wherein the method 900 may include identifying if the EVSE 112 is charging equipment that is manufactured, maintained, and/or owned by a stakeholder associated with the remote server 108. In an exemplary embodiment, if the remote server 108 receives the duty cycle pattern 500 that is communicated from the EV 102 (at block 912), the identification module may be configured to enable the processor 404 of the remote server 108 to analyze the duty cycle pattern 500 to compare the EVSE ID previously inputted within the EVSE ID portion 606 of the encrypted data packet 600 with the pre-stored EVSE ID 314 inputted within the encrypted data packet 600 by the duty cycle module 704 (at block 912).

In particular, the processor 404 may be configured to analyze the encrypted data packet 600 to extract the EVSE ID 416 that was retrieved from the data store 408 of the remote server 108 and previously inputted within the EVSE ID portion 606 (at block 904). Additionally, the processor 404 may be configured to extract the pre-stored EVSE ID 314 that was inputted from the data store 308 of the EVSE computing device 302 of the EVSE 112 within the encrypted data packet 600 (at block 912). Upon extraction of the previously inputted EVSE ID 416 and the pre-stored EVSE ID 314 from the EVSE ID portion 606 of the encrypted data packet 600, the identification module 706 may be configured to compare the EVSE ID 416 that was retrieved from the data store 408 of the remote server 108 and previously encrypted within the encrypted data packet 600 (at block 904) of the duty cycle pattern 500 with the pre-stored EVSE ID 314 to identify the EVSE 112 as one that matches.

If the identification module 706 determines that there is a match between the EVSE ID 416 previously inputted within the EVSE ID portion 606 (at block 904) and the pre-stored EVSE ID 314 that was inputted from the data store 308 of the EVSE 112 within the encrypted data packet 600 (at block 912), the identification module 706 may be configured to identify the EVSE 112 which may be manufactured, maintained, and/or owned by a stakeholder (e.g., OEM, dealer, third-party organization). Alternatively, if a match is not determined between the EVSE ID 314 previously inputted within the EVSE ID portion 606 (at block 904) and the pre-stored EVSE ID 416 that was inputted from the data store 308 of the EVSE computing device 302 within the encrypted data packet 600 (at block 912), the identification module 706 may be configured to identify the EVSE 112 as being charging equipment that may not be manufactured, maintained, and/or owned by the stakeholder.

In one configuration, if the identification module 706 identifies the EVSE 112 as being manufactured, maintained, and/or owned by a stakeholder, the identification module 706 may be configured to communicate with the processor 304 of the EVSE computing device 302 of the EVSE 112 to control the EVSE 112 to provide charging power to the EV 102 through the charging link 114. Accordingly, the EVSE 112 may be controlled to provide charging power and the EV 102 may be controlled to receive charging power to charge the battery 106 of the EV 102 based on the identification of the EVSE 112 as being manufactured, maintained, and/or owned by a stakeholder. In additional configurations, the identification of the EVSE 112 as being manufactured, maintained, and/or owned by a stakeholder may be used to provide customized charging patterns, maintenance planning, charging schedules, life cycle planning, charging configurations, grid stability, load control, cost savings, depreciation determination, demand response planning, and the like that may be utilized with respect to the EVSE 112 and/or the EV 102.

It is appreciated that method 800 and method 900 may be executed in combination such that the VIN 414 and/or pre-stored VIN 214 of the EV 102 and the EVSE ID 416 and/or pre-stored EVSE ID 314 of the EVSE 112 may be encrypted within the encrypted data packet 600 and included within the duty cycle pattern 500 to identify the EV 102 and the EVSE 112 as being manufactured, maintained, and/or owned by one or more respective stakeholders. For example, the charging identification application 118 may be configured to include an encrypted data packet within the second state 504 and/or the third state 506 of the duty cycle pattern 500 that includes the VIN 414 and/or pre-stored VIN 214 of the EV 102 within the VIN portion 604 of the encrypted data packet 600 and the EVSE ID 416 and/or pre-stored EVSE ID 314 of the EVSE 112 within the EVSE ID portion 606 of the encrypted data packet 600 that is communicated between the remote server 108, the EVSE 112, and the EV 102.

Figure 10:
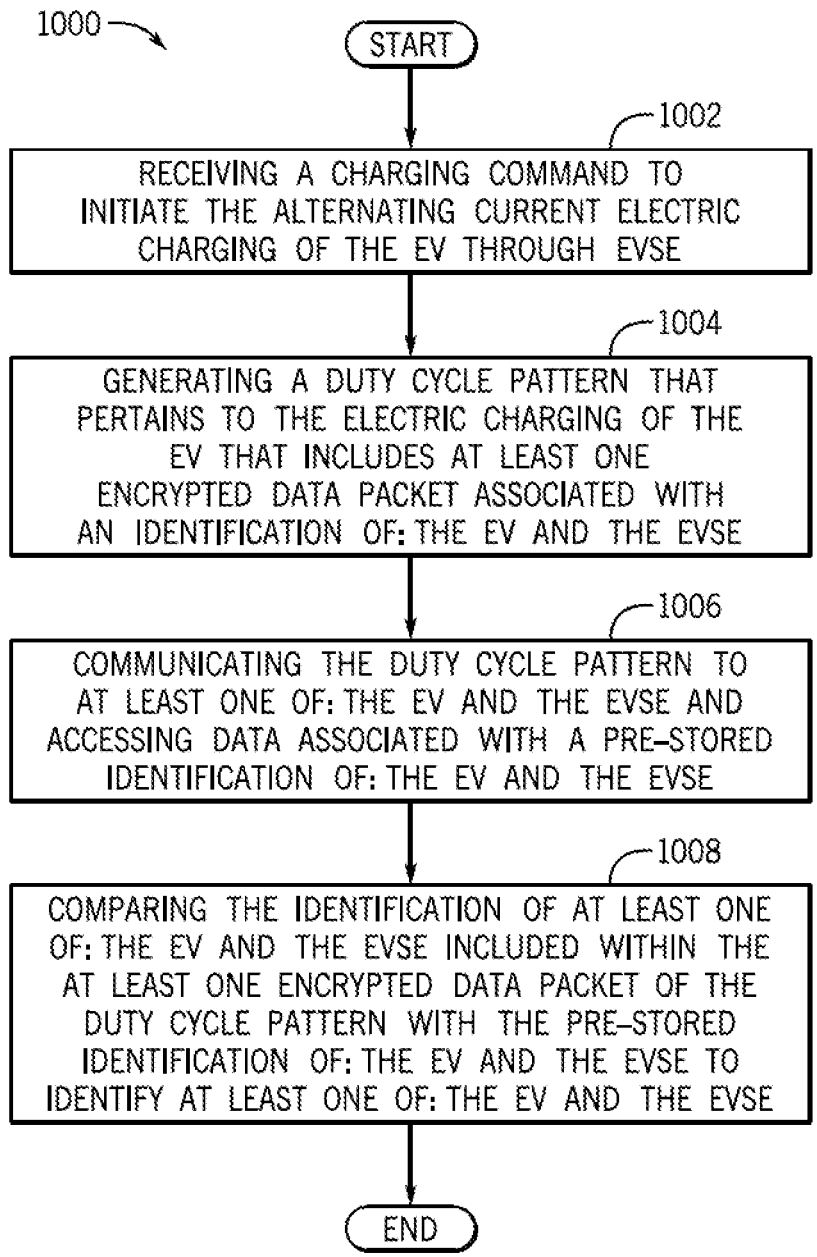
FIG. 10 is a process flow diagram of a method of a method for identifying an EV through an alternating current electric charging according to an exemplary embodiment of the present disclosure.

FIG. 10 is a process flow diagram of a method 1000 for identifying an EV 102 through an alternating current electric charging according to an exemplary embodiment of the present disclosure. FIG. 10 will be described with reference to the components of FIGS. 1-7 though it is to be appreciated that the method 1000 of FIG. 10 may be used with other systems and/or components. The method 1000 may begin at block 1002, wherein the method 1000 may include receiving a charging command to initiate the alternating current electric charging of the EV 102 through EVSE 112.

The method 1000 may proceed to block 1004, wherein the method 1000 may include generating a duty cycle pattern that pertains to the electric charging of the EV 102 that includes at least one encrypted data packet associated with an identification of at least one of: the EV 102 and the EVSE 112. The method 1000 may proceed to block 1006, wherein the method 1000 may include communicating the duty cycle pattern to at least one of: the EV 102 and the EVSE 112 and accessing data associated with a pre-stored identification of: the EV 102 and the EVSE 112. The method 1000 may proceed to block 1008, wherein the method 1000 may include comparing the identification of at least one of: the EV 102 and the EVSE 112 included within the at least one encrypted data packet of the duty cycle pattern with the pre-stored identification of at least one of: the EV 102 and the EVSE 112 to identify at least one of the: EV 102 and the EVSE 112.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optimal storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for identifying and authenticating an electric vehicle (EV) and electric vehicle supply equipment (EVSE) during an alternating current electric charging process, comprising:
   receiving, by a charging control system, a charging command to initiate the alternating current electric charging of the electric vehicle (EV) through the EVSE;
   generating, by the charging control system, a duty cycle pattern that pertains to the electric charging of the EV, wherein the duty cycle pattern includes at least one encrypted data packet associated with an identification of the EV and the EVSE;
   communicating, by the charging control system, the duty cycle pattern to at least one of the EV and the EVSE;
   accessing, by the charging control system, data associated with a pre-stored identification of the EV and the EVSE from a remove server;
   comparing, by the charging control system, the identification of the EV and the EVSE included within the at least one encrypted data packet of the duty cycle pattern with the pre-stored identification of the EV and the EVSE to authenticate and enable the electric charging of the EV and the EVSE;
   wherein the charging control system is configured to control the EVSE to initiate the alternating current electric charging of the EV upon successful authentication of the EV and the EVSE based on the comparison of the identifications.

2. The computer-implemented method of claim 1, wherein at least one of: a vehicle identification number (VIN) of the EV and an EVSE identification designation (EVSE ID) is stored upon a data store of the remote server that is managed by a stakeholder, wherein the stakeholder is a party that manufactures, owns, or maintains at least one of: the EV and the EVSE.

3. The computer-implemented method of claim 2, wherein the duty cycle pattern includes a plurality of charging states that pertain to a maximum and minimum voltage that is utilized by the EVSE, wherein the plurality of charging states include a first state that pertains to a disconnected state of the EV from the EVSE, a second state that pertains to an active connection between the EVSE and the EV prior to the charging of the EV by the EVSE, and a third state that pertains to active charging of the EV by the EVSE.

4. The computer-implemented method of claim 3, wherein the encrypted data packet includes a VIN portion and an EVSE ID portion, wherein the VIN portion is populated with the VIN of the EV that is retrieved from the data store of the remote server and the EVSE ID portion is populated with the EVSE ID of the EVSE that is retrieved from the data store of the remote server.

5. The computer-implemented method of claim 4, wherein the encrypted data packet is included within at least one of: the second state and the third state of the plurality of charging states of the duty cycle pattern.

6. The computer-implemented method of claim 4, wherein accessing data associated with a pre-stored identification of: the EV and the EVSE includes accessing at least one of a pre-stored VIN of the EV from a data store of the EV and a pre-stored EVSE ID of the EVSE from a data store of the EVSE.

7. The computer-implemented method of claim 6, further including adding at least one of: the pre-stored VIN to the VIN portion of the encrypted data packet and the pre-stored EVSE ID to the EVSE ID portion of the encrypted data packet.

8. The computer-implemented method of claim 7, wherein comparing the identification includes comparing the VIN of the EV that is retrieved from the data store of the remote server that is populated within the VIN portion of the encrypted data packet with the pre-stored VIN to identify if the EV is manufactured, owned, or maintained by a particular stakeholder.

9. The computer-implemented method of claim 7, wherein comparing the identification includes comparing the EVSE ID of the EVSE that is retrieved from the data store of the remote server that is populated within the EVSE ID portion of the encrypted data packet with the pre-stored EVSE ID to identify if the EVSE is manufactured, owned, or maintained by a particular stakeholder.

10. A system for identifying and authenticating an electric vehicle (EV) and electric vehicle supply equipment (EVSE) during an alternating current electric charging process, comprising:
   a memory storing instructions when executed by a processor cause the processor to:
   receive a charging command to initiate the alternating current electric charging of the electric vehicle (EV) through the EVSE;
   generate a duty cycle pattern that pertains to the electric charging of the EV, wherein the duty cycle pattern includes at least one encrypted data packet associated with an identification of the EV and the EVSE;
   communicate the duty cycle pattern to at least one of: the EV and the EVSE and access data associated with a pre-stored identification of the EV and the EVSE from a remote server; and
   compare the identification of at least one of: the EV and the EVSE included within the at least one encrypted data packet of the duty cycle pattern with the pre-stored identification of the EV and the EVSE to authenticate and enable the electric charging of the EV and the EVSE;
   wherein the charging control system is configured to control the EVSE to initiate the alternating current electric charging of the EV upon successful authentication of the EV and the EVSE based on the comparison of the identifications.

11. The system of claim 10, wherein at least one of: a vehicle identification number (VIN) of the EV and an EVSE identification designation (EVSE ID) is stored upon a data store of the remote server that is managed by a stakeholder, wherein the stakeholder is a party that manufactures, owns, or maintains at least one of: the EV and the EVSE.

12. The system of claim 11, wherein the duty cycle pattern includes a plurality of charging states that pertain to a maximum and minimum voltage that is utilized by the EVSE, wherein the plurality of charging states include a first state that pertains to a disconnected state of the EV from the EVSE, a second state that pertains to an active connection between the EVSE and the EV prior to the charging of the EV by the EVSE, and a third state that pertains to active charging of the EV by the EVSE.

13. The system of claim 12, wherein the encrypted data packet includes a VIN portion and an EVSE ID portion, wherein the VIN portion is populated with the VIN of the EV that is retrieved from the data store of the remote server and the EVSE ID portion is populated with the EVSE ID of the EVSE that is retrieved from the data store of the remote server.

14. The system of claim 13, wherein the encrypted data packet is included within at least one of: the second state and the third state of the plurality of charging states of the duty cycle pattern.

15. The system of claim 13, wherein accessing data associated with a pre-stored identification of: the EV and the EVSE includes accessing at least one of a pre-stored VIN of the EV from a data store of the EV and a pre-stored EVSE ID of the EVSE from a data store of the EVSE.

16. The system of claim 15, wherein the instructions cause the processor to add at least one of: the pre-stored VIN to the VIN portion of the encrypted data packet and the pre-stored EVSE ID to the EVSE ID portion of the encrypted data packet.

17. The system of claim 16, wherein comparing the identification includes comparing the VIN of the EV that is retrieved from the data store of the remote server that is populated within the VIN portion of the encrypted data packet with the pre-stored VIN to identify if the EV is manufactured, owned, or maintained by a particular stakeholder.

18. The system of claim 16, wherein comparing the identification includes comparing the EVSE ID of the EVSE that is retrieved from the data store of the remote server that is populated within the EVSE ID portion of the encrypted data packet with the pre-stored EVSE ID to identify if the EVSE is manufactured, owned, or maintained by a particular stakeholder.

19. A non-transitory computer readable storage medium storing instructions that when executed by a computer, which includes a processor perform a method, the method comprising:

receiving a charging command to initiate alternating current electric charging of an electric vehicle (EV) through electric vehicle supply equipment (EVSE);

generating a duty cycle pattern that pertains to the electric charging of the EV, wherein the duty cycle pattern includes at least one encrypted data packet associated with an identification of the EV and the EVSE;

communicating the duty cycle pattern to at least one of the EV and the EVSE;

accessing data associated with a pre-stored identification of the EV and the EVSE from a remote server;

comparing the identification of the EV and the EVSE included within the at least one encrypted data packet of the duty cycle pattern with the pre-stored identification of the EV and the EVSE to authenticate and enable the electric charging of the EV and the EVSE;

wherein the charging control system is configured to control the EVSE to initiate the alternating current electric charging of the EV upon successful authentication of the EV and the EVSE based on the comparison of the identifications.

20. The non-transitory computer readable storage medium of claim 19, wherein comparing the identification includes comparing a vehicle identification number (VIN) of the EV that is retrieved from a data store of the remote server that is populated within a VIN portion of the encrypted data packet with a pre-stored VIN to identify if the EV is manufactured, owned, or maintained by a particular stakeholder.

* * * * *